UNITED STATES PATENT OFFICE.

GEORGE WHITE, OF NEW YORK, N. Y., ASSIGNOR TO THE H. N. BURDICK MANUFACTURING COMPANY, OF SAME PLACE.

COMPOUND FOR PERFECTING THE COMBUSTION OF COAL OR OTHER FUEL.

SPECIFICATION forming part of Letters Patent No. 347,078, dated August 10, 1886.

Application filed December 2, 1885. Serial No. 184,454. (No specimens.)

*To all whom it may concern:*

Be it known that I, GEORGE WHITE, a citizen of the United States of America, and of the State of New York, and a resident of No. 213 East 50th street, in the city of New York, in the county and State of New York, have invented a new and useful Improvement in a Compound for Perfecting the Combustion of Coal or other Fuel, of which the following is a full and exact specification.

My improvement is intended to render perfect and complete the combustion of coal or other carbonaceous fuel by depriving it of its impurities, which are carried off without injury to the stove or furnace, by increasing the heat-producing qualities, by lengthening the time of carbonization, and by minimizing the waste. This object will be attained by the use of cheap ingredients, easily obtainable, which are chosen and calculated, when used together in my compound, to render the coal or other fuel more serviceable in the particulars stated.

My compound consists of a composition of sulphate of soda and chloride of sodium, together with an absorbent. I prefer lime, plaster, cement, or charcoal in the amounts and proportions hereinafter set forth, mixed and ground together. It may be applied to the fuel either in a dry state or dissolved in water.

I claim for my said compound that it will separate the impurities common to all commercial coal or other fuel from the same, and bring forth the combustible properties thereof, and so increase the amount of heat produced from a given quantity that it will retard the immediate total escape of the entire volume of volatile matter contained in the fuel, so as to admit of the gradual and complete burning up thereof, and thus prolong the heat-forming process, and also that by the action of the heat upon the gases given up by the ignition of the fuel and the compound and upon the absorbent there is formed a flux for the fuel impurities, the result of which will be that these impurities, instead of forming clinkers adhering to the grates, bars, and inner surfaces of the stove or furnace, will pass off in composition with their flux, and will be found in the ash-receptacle.

Fires produced by the combustion of coal, wood, or other fuel, consume large quantities of the fuel without yielding the proportionate quantity of heat which should be anticipated from the chemical qualities of the known ingredients of the materials.

Fuel, such as coal, composed of certain volatile constituents—carbon, oxygen, hydrogen, and nitrogen—together with some earthy vegetable substances, when subjected to the action of fire gives out, in addition to the desired heat, gases, compositions, in varying proportions, of carbon and oxygen, many of which pass off without producing any heat and are totally wasted. My compound will utilize the heat-producing elements of these otherwise unproductive gases.

The well-known affinity of chlorine gas, which is generated in large quantities from my compound during the process of combustion, for hydrogen and other elements, and its power of substitution as an equivalent for oxygen, both combine—the former by producing a new heat agent, and the latter by affording a valuable assistant to the oxygen—largely to increase the amount of heat sent forth, and to prolong the time of combustion.

The superior advantages of my invention are obvious.

The lime, cement, plaster, charcoal, or other absorbent, as used in my compound, is a new and valuable invention, and is useful and necessary for two reasons—first, to preserve the compound on account of its great attraction for the water which it absorbs from various sources, and, second, to act as a flux for the fuel impurities, as above set forth. The water so absorbed by the compound while awaiting use is decomposed into its elements, hydrogen and oxygen, during the process of combustion, and these elements materially assist in the above heat-producing process. When dissolved in water and used in solution, the compound so formed has additional capacities as a heat-producer, for the reason that the water, when acted upon by fire, together with the water taken in and held by the absorbent, is resolved into its component parts, and the chlorine gas exerts its great affinity for hydrogen, and leaves the oxygen free to act upon the coal gases. This makes the compound as dissolved particularly valuable for realizing a high degree of heat.

There have been previous inventions for fuel compositions, consisting of sulphate of soda and chloride of sodium in combination with aluminous earths and carbonaceous fuel; but these combinations are inferior to mine, for the reason that they do not possess the powers of absorption which belong to mine, and are therefore liable to waste, and in addition they corrode and rot substances with which they come in contact during the process of manufacture while stored for use, and while being used. They do not, moreover, act to the same extent as my invention for the purposes stated.

Other combinations have been used combining some of the substances which I use; but none of them produce the desired results to any extent approaching mine, and they are for the most part costly and not easily handled in trade.

When using my invention, I take chloride of sodium, or common salt, sulphate of soda, known, commercially, as "Glauber's salt," and an absorbent—preferably lime, cement, plaster, or charcoal—in proportions varying within large limits. I prefer to use them in the proportion of four, (4,) three, (3,) and four, (4,) respectively—that is, four parts, by weight, of common salt, three parts, by weight, of sulphate of soda, and four parts, by weight, of either lime, cement, plaster, or charcoal. These components I grind and mix well together.

When prepared, my compound may be applied in a dry state to the fuel in the proportion of one and a-half pounds of the compound, more or less, to a ton of coal or other fuel. It may also be mixed with water in the proportion of one and one-half pound to from two to six gallons of water, more or less, depending upon the quality of the fuel, and then applied to the fuel by sprinkling in the proportion aforesaid.

What I claim as my invention is—

1. The improved compound composed of chloride of sodium, sulphate of soda, and lime, cement, plaster, charcoal, or any other similar absorbent, substantially as and for the purposes herein set forth.

2. The improved compound composed of chloride of sodium, sulphate of soda, and lime, cement, plaster, charcoal, or any other similar absorbent, and water, substantially as and for the purposes herein set forth.

In testimony that I claim the foregoing as my invention I have signed my name, in presence of two witnesses, this 30th day of November, 1885.

GEORGE WHITE.

Witnesses:
DANIEL P. MAHONEY,
FRANK McDONNELL.